United States Patent [19]

Nakajima

[11] Patent Number: 5,264,935

[45] Date of Patent: Nov. 23, 1993

[54] SYSTEM FOR WIRELESS TRANSMISSION AND RECEPTION OF A VIDEO SIGNAL AND CORRESPONDING AUDIO SIGNAL

[75] Inventor: Yasuhisa Nakajima, Kanagawa, Japan

[73] Assignee: Sony Corporation, Tokyo, Japan

[21] Appl. No.: 897,475

[22] Filed: Jun. 12, 1992

[30] Foreign Application Priority Data

Jun. 18, 1991 [JP] Japan ................................. 3-146321
Jun. 18, 1991 [JP] Japan ................................. 3-146322

[51] Int. Cl.⁵ ......................... H04N 5/268; H04N 5/30
[52] U.S. Cl. ..................... 358/181; 358/906; 358/209
[58] Field of Search ............... 358/108, 125, 186, 188, 358/181, 183, 187, 906, 209

[56] References Cited

U.S. PATENT DOCUMENTS

| | | | |
|---|---|---|---|
| 4,665,438 | 5/1987 | Miron et al. | 358/183 |
| 4,680,634 | 7/1987 | Namba et al. | 358/181 |
| 4,868,660 | 9/1989 | Rufray | 358/181 |
| 5,047,860 | 9/1991 | Rogalski | 358/143 |
| 5,128,766 | 7/1992 | Choi | 358/183 |
| 5,132,800 | 7/1992 | Wada et al. | 358/209 |
| 5,134,483 | 7/1992 | Imbert et al. | 358/181 |
| 5,189,520 | 2/1993 | Okayasu et al. | 358/209 |

FOREIGN PATENT DOCUMENTS 2238624  6/1991  United Kingdom .

Primary Examiner—James J. Groody
Assistant Examiner—John W. Miller
Attorney, Agent, or Firm—Lewis H. Eslinger; Jay H. Maioli

[57] ABSTRACT

A system for wireless transmission and reception of a video signals has a transmitting apparatus provided with terminals corresponding and attachable to terminals of a camcorder or other such video camera body so as to facilitate signal connection with an input source. Receiving apparatus is provided with an input switch which automatically switches between a broadcast TV signal and a signal transmitted from the video camera, depending on the absence or presence of a signal transmitted from the video camera.

3 Claims, 4 Drawing Sheets

SYSTEM FOR WIRELESS TRANSMISSION AND RECEPTION OF A VIDEO SIGNAL AND CORRESPONDING AUDIO SIGNAL

BACKGROUND OF THE INVENTION

1. Field of the Invention

The present invention relates to a system for wireless transmission and reception of a video signal, in particular a system having a transmitting apparatus which can be directly attached to a body of a camcorder or other video camera and a system having a receiving apparatus which has an automatic input switching apparatus which automatically switches television signals.

2. Description of the Related Art

Systems are known for wireless transmission and reception of video signals. Such video wireless transmitting and receiving systems are used for example in the indoor transmitting and receiving systems popular in the U.S. and elsewhere. As shown in FIG. 6, to view a video taken by a video camera 12 (for convenience, referred to as the first television signal S1) by a television receiver 26, the video camera 12 and the television receiver 26 are connected by a cable of generally a short length of 1 to 2 meters. It is therefore necessary to operate the video camera 12 close to the television receiver 26.

To eliminate this inconvenience, the video transmitting and receiving system 10 was developed, which allows operation of the video camera 12 even from a position a certain distance away from the television receiver 26.

The output signal from the video camera 12 (RF output of video output and audio output), however, is connected to a transmitting apparatus 14 by a connection cable 13. The transmitting apparatus 14 is also supplied with power using, for example, an AC adapter.

In this way, to display a video of a video camera 12 by a television receiver 26, it is necessary to connect the video camera 12 and the transmitting apparatus 14 by a connection cable 13 and to connect a power supply, so not only are the preparations troublesome, but also when the connection cable 13 is lost, it is impossible to use the transmitting and receiving system. Therefore, the management and storage of the accessories are also troublesome.

In the video wireless transmitting and receiving system 10 used indoors etc., the first and second television signals S1 and S2 are switched manually, so the switching and the confirmation of the switching state are extremely bothersome. In particular, the receiving apparatus 20 is often disposed near to the television receiver 26, so when viewing the first television signal S1, it is necessary to confirm the switching state of the input switching means 22 each time.

SUMMARY OF THE INVENTION

The present invention has as its object to resolve these conventional problems and provide a system for wireless transmitting and receiving of a video having a transmitting apparatus which can be easily connected to an input source without the use of a connection cable etc. and an automatic input switching apparatus able to automatically switch television signals.

To achieve the above object, the system for wireless transmitting and receiving of a video is characterized in that provision is made of a transmitting apparatus having terminals corresponding and attachable to video and audio external terminals and a power supply external terminal of the body of a camcorder or other video camera. Also, provision is made of a receiving apparatus which has an input switching means which switches and supplies to a television receiver a first television signal and a second television signal, which input switching means automatically switches so as to select the above-mentioned first television signal only when a video carrier and a video signal of the received first television signal are simultaneously detected.

As shown in FIG. 5, the video camera body 30 is provided with external output terminals 40 and 42 for audio and video signals and further is provided with a power supply terminal 44 which can supply to the outside power from a supply (battery or AC adapter) attached to the video camera body 30.

The transmitting apparatus 14 is provided with terminals 50, 52, and 54, integral therewith, which are attachable to these external terminals 40, 42, and 44. If these terminals 50, 52, and 54 are attached to the external terminals 40, 42, and 44, the video camera body 30 and the transmitting apparatus 14 itself are completely connected electrically and mechanically.

Therefore, transmission can be prepared for by just attaching the transmitting apparatus 14 to the video camera body 30 as a kind to accessory of the video camera 12.

Further, as shown in FIG. 7, at the receiving side, when a first television signal S1 is received by a receiving antenna 118, the video carrier in the first television signal S1 is detected by a carrier detection circuit 136, so the carrier detection output Sa is obtained.

Similarly, when the first television signal S1 is normally received, the video signal is detected by a video signal detection circuit 144, so the video signal detection output Sb is also obtained at that time. The input switching means 122 automatically switches to the first television signal S1 side by the AND output at the time the carrier detection output Sa and the video signal detection output Sb are obtained. In other cases, the input switching means 122 is controlled so as to enable the second television signal S2 to be selected.

DETAILED DESCRIPTION OF THE INVENTION

An example of the system for wireless transmitting and receiving a video according to the present invention will now be explained in detail for the case of application to the above-mentioned camcorder and with reference to the drawings.

Figure 5:
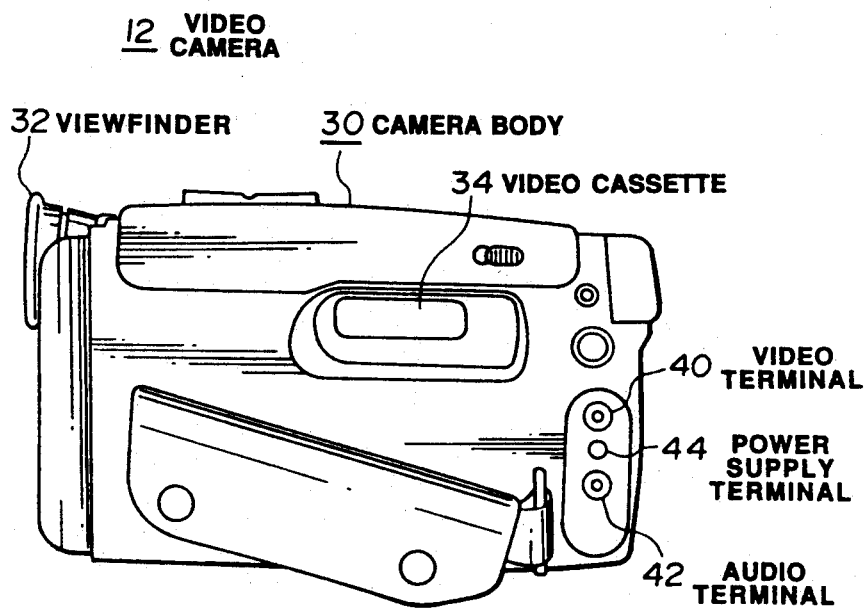
FIG. 5 is a side view of an example of a video camera.

A camcorder or other video camera is often constructed as shown in FIG. 5. In the figure, reference numeral 30 shows the video camera body, 32 an optical or electronic viewfinder, and 34 a video cassette mounted in the video camera body 30. A plurality of external terminals are provided at part of the video camera body 30, in this example, the side where the video cassette is mounted.

In the figure, only the RF modulator terminals relating to the present invention are shown. Reference numeral 40 is an external terminal for output of a video signal (video terminal), 42 is an external terminal for output of an audio signal (audio terminal), and 44 is an external terminal for the power supply (power supply terminal). A pin-jack construction (female type) is used in all cases. The arrangements and positions of the external terminals 40, 42, and 44 are all merely examples.

In the present invention, a transmitting apparatus 14 is constituted so as to be attachable to the video camera body 30 with the external terminals 40, 42, and 44 through these terminals. In other words, as shown in FIG. 1, it is provided with a video signal input terminal 50, an audio signal input terminal 52, and a power supply input terminal 54 in a manner corresponding to these external terminals 40, 42, and 44.

Figure 1:
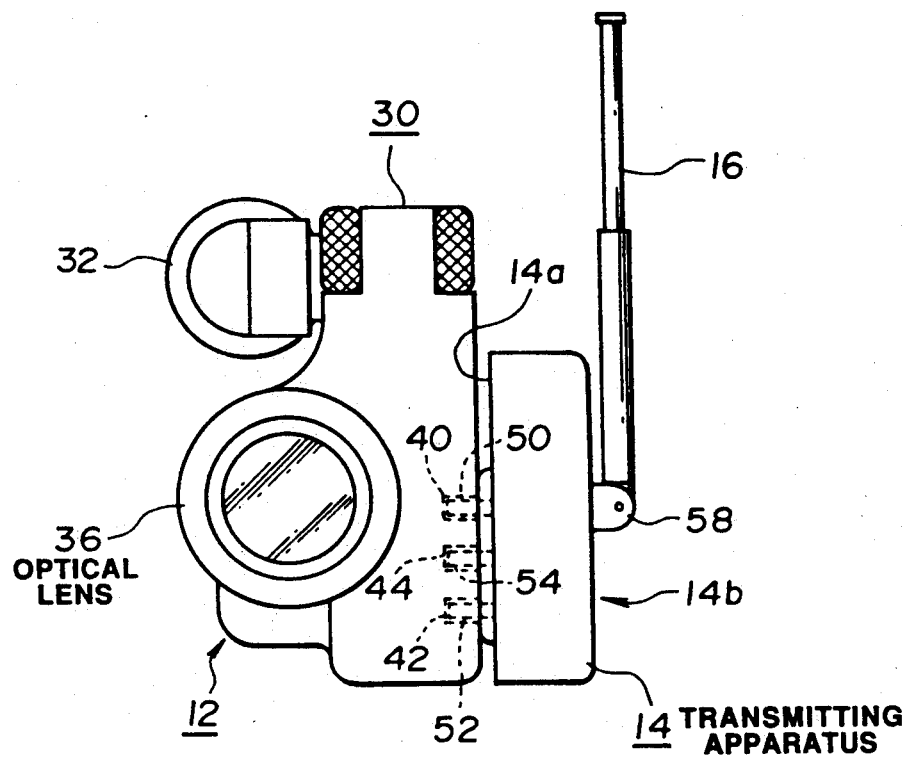
FIG. 1 is a view of an example of the state of use of a system for wireless transmitting and receiving of a video according to the present invention.
Figure 2:
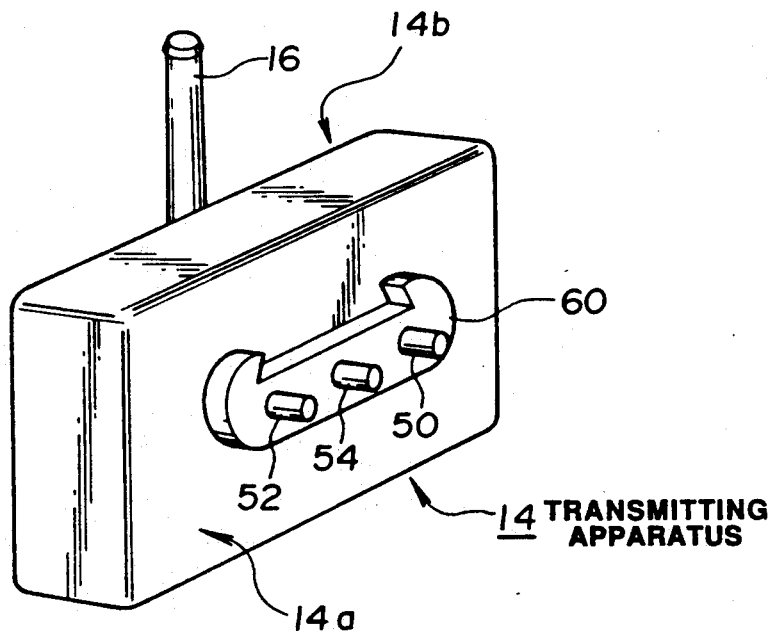
FIG. 2 is a perspective view of a system for wireless transmitting and receiving of a video according to the present invention.

FIG. 2 shows details of this. The transmitting apparatus 14 itself is made a flat box shape (of any size). At one surface 14a of this, the above-mentioned plurality of input terminals 50, 52, and 54 are provided in the above-mentioned predetermined relationship. These are all made pin-plugs (male types) due to the relationship with the external terminals 40, 42, and 44. The input terminals 50, 52, and 54 all are positioned on a projecting portion 60 of the surface 14a. This is to facilitate the attachment operation when attaching the transmitting apparatus 14 to the video camera body 30 as shown in FIG. 1.

Figure 3:
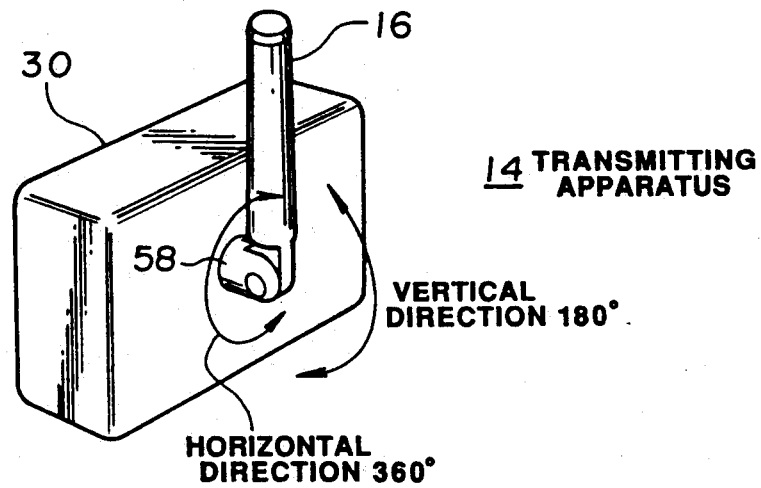
FIG. 3 is a perspective view of a system for wireless transmitting and receiving of a video from the side opposite to FIG. 2.
Figure 4:
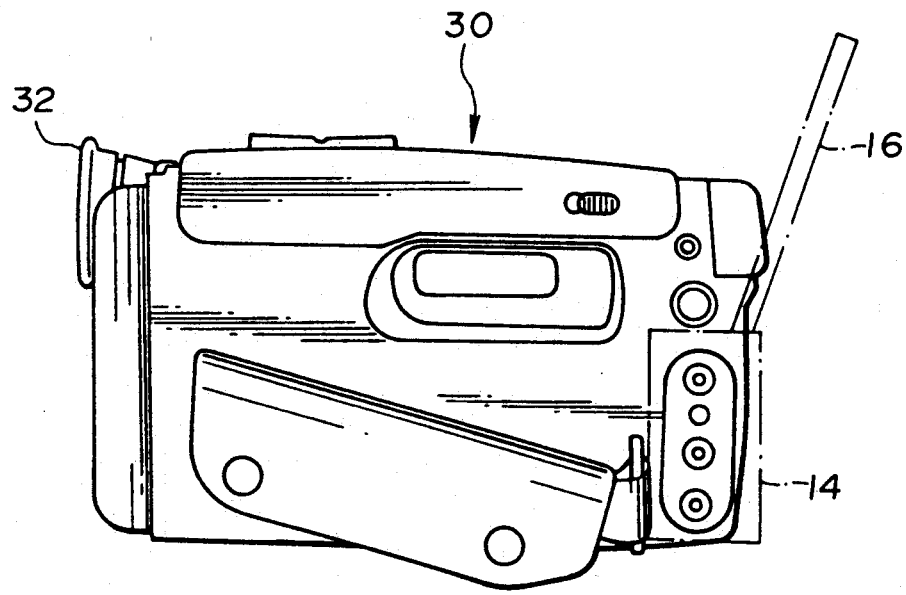
FIG. 4 is a view of an example of the state of use of a system for wireless transmitting and receiving of a video signal according to the present invention.

At another surface 14b of the transmitting apparatus 14 a transmission antenna 16 is affixed to a rotating hinge 58 as shown in FIG. 3 and thus can be freely turned 360 degrees in the horizontal direction and 180 degrees in the vertical direction. Therefore, the direction of the transmission antenna 16 can be freely changed (see FIG. 4).

The thus constructed transmitting apparatus 14 is attached to the video camera body 30 as a kind of accessory of the video camera 12 as shown in FIG. 1. By this attachment, the video output during replay by the video camera 12 is supplied through the external terminal 40 to the video signal input terminal 50. Similarly, the audio output is supplied through the external terminal 42 to the audio signal input terminal 52. Further, the DC power supply of the video camera 12 is supplied through the external terminal 44 to the power supply input terminal 54 as the power supply for the transmitting apparatus.

As a result, it is possible to electrically connect the video camera 12 and the transmitting apparatus 14 without the use of a connection cable 13. Since drive power can be supplied from the outside even without the use of an AC adapter etc., the transmitting apparatus 14 can be driven and the first television signal S1 transmitted by just attaching the transmitting apparatus 14 to the video camera body 30 and then placing the video camera 12 in the replay mode.

In the above, the transmitting apparatus was constructed so as to be able to be attached to a video camera like a camcorder, but the present invention can be applied to other video cameras so long as they have external terminals for RF modulators on their main bodies. There are differences in the arrangement and construction of the external terminals in different models, however, so sometimes the transmitting apparatus should be modified to match the same.

As explained above, in the system for wireless transmitting and receiving a video according to the present invention, the transmitting apparatus is provided with terminals corresponding and attachable to the video and audio external terminals and a power supply external terminal provided at the body of a video camera like a camcorder.

By doing this, preparations for transmission can be completed by just attaching the transmitting apparatus to the video camera body. Therefore, there is the advantage that the troublesome work of connecting the video camera and transmitting apparatus body with a signal cable and connecting a power supply can be completely eliminated.

In addition to this, in the past, the cables and other accessories had to be carefully managed and stored since if the cables etc. were lost, the transmitting and receiving system could no longer be used. In the present invention, this troublesome work is not required and therefore management is extremely simple.

Due to the above, the present invention is well suited for application to a system for wireless transmitting and receiving of a video which uses a video camera such as a camcorder as the source of input of the transmitting apparatus.

Next, an example of an automatic input switching apparatus according to the present invention as applied to the above-mentioned system for wireless transmitting and receiving of a video will be explained in detail with reference to the drawings.

Figure 7:
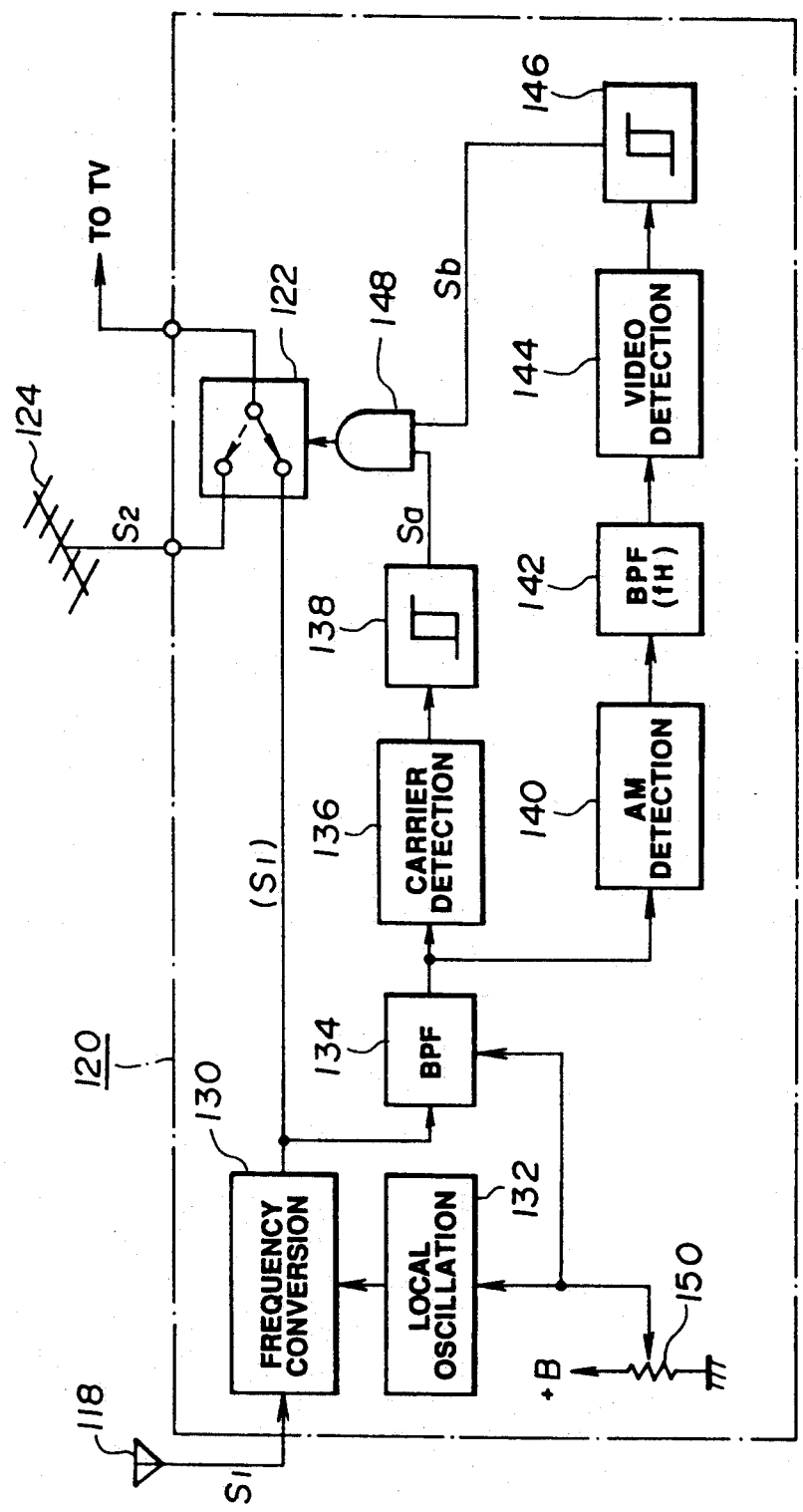
FIG. 7 is a diagram of a system showing an example of an automatic input switching apparatus according to the present invention.

This automatic input switching apparatus is built into the receiving apparatus 120 in the video wireless transmitting and receiving system. As shown in FIG. 7, the first television signal S1 received by the receiving antenna 118 is converted to a frequency band of an empty channel (for example, channel 3) of the television channels as mentioned above in a frequency conversion circuit 130. A local oscillation circuit 132 is provided in the frequency conversion circuit 130 for this frequency conversion.

Figure 6:
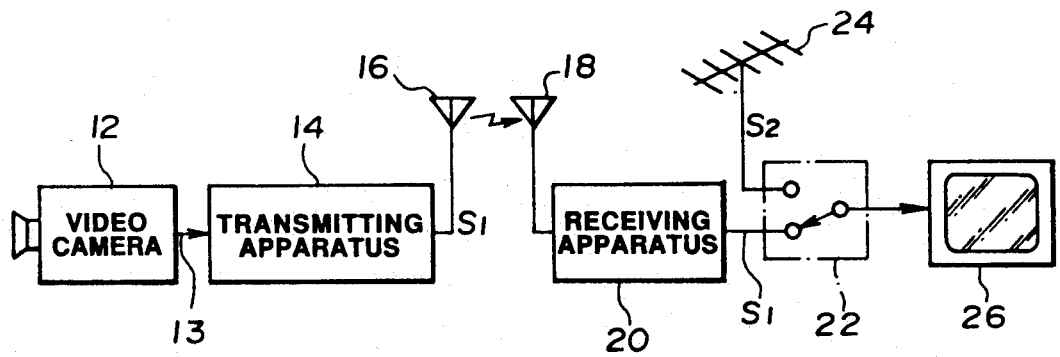
FIG. 6 is a diagram of a system for wireless transmitting and receiving of a video.

The frequency-converted first television signal S1 is supplied to the input switching means 122. A second television signal S2 is also supplied here. One of these is selected and supplied to a television receiver 26 (FIG. 6). The input switching means 122 is automatically controlled by the output explained below.

The frequency-converted first television signal S1 is supplied to a bandpass filter 134 and is limited so that only the band of the video carrier of the designated empty channels (channel 3 or 4) is passed. The first television signal S1 passing through the bandpass filter 134 is supplied to the next carrier detection circuit 136, where a video carrier is detected. The detected video carrier is supplied to a comparator 138 having a hysteresis function and a video carrier of over a predetermined level is detected. This detected output is used as the carrier detection output Sa.

The comparator 138 is given a hysteresis function so as to avoid erroneous detection of the presence of a video carrier even when a video carrier occurs only instantaneously.

The first television signal S1 passing through the bandpass filter 134 is further supplied to an AM detection circuit 140, where the video signal of the first television signal S1 is AM detected. The AM detection output is passed through a bandpass filter 142 and the high band portion of the video signal is output and supplied to a video detection circuit 144. When the television signal is accompanied with a video signal, a predetermined video detection output is obtained from the video detection circuit 144, so this is further compared in level at the comparator 146 with the hysteresis function.

Therefore, when the video output is of more than a predetermined level, the video detection output Sb is obtained. This is logically added with the above-mentioned carrier detection output Sa at an AND circuit 148. The AND output is supplied to the input switching means 122 as a switching control signal. The input switching means 122 switches to the first television signal S1 side only when both the carrier detection output Sa and the video detection output Sb are obtained.

The input switching means 122 is made to switch only when the carrier detection output Sa and the video detection output Sb are simultaneously obtained so as to avoid erroneous operation. By doing this, the input switching means 122 can be made to automatically switch only when the first television signal S1 is received.

In the usual mode, that is, when viewing a broadcast television signal, there is no first television signal S1, so the input switching means 122 becomes the state of switching shown by the broken line.

In FIG. 7, when use is made of a voltage-control type oscillator (VCO, VCXO, etc.) as a local oscillator 132, if the bandpass filter 134 is made a tuning type bandpass filter, it becomes possible to set the bandpass frequency to a suitable value by a voltage control signal.

For example, it is possible to synchronize and modify the local oscillation frequency of the local oscillator 132 and the bandpass frequency of the bandpass filter 134 based on a voltage control signal obtained from a variable resistor 150 in accordance with whether the first television signal S1 is frequency converted to the frequency of channel 3 or that of channel 4. By doing this, the selectivity of the bandpass filter 134 becomes higher and the precision of carrier detection can be raised by that much more.

Note that while the automatic input switching apparatus was applied to a system for wireless transmitting and receiving a video, it may also be used for a television signal in a multi-source type television receiver.

In the above way, in the automatic input switching apparatus according to the present invention, the input switching means is automatically controlled so as to select the first television signal side when the video carrier and the video signal of the first television signal are simultaneously detected.

By this, it is possible to automatically select a television signal by the absence or presence of input, so there is no need for manual switching of the input. This is very convenient in terms of use and means that no errors occur in the switching of input. Therefore, the apparatus is extremely suitable for application to the system for wireless transmitting and receiving a video.

I claim:

1. A system for wireless transmission and reception of a first television signal including a video signal and a corresponding audio signal and for selective reception of the first television signal or a second broadcast television signal for display on a television receiver, said system comprising:
   a wireless transmitting apparatus having a plurality of plugs which can be attached directly to a corresponding plurality of jacks provided on the body of a video camera, said plurality of jacks including output terminals for a video signal and audio signal and an output terminal for a power supply; and
   a receiving apparatus for receiving a video signal and a corresponding audio signal including switching means for selectively automatically supplying the first television signal or the second television signal to the television receiver;
   whereby said video, audio and power supply jacks of said transmitting apparatus can be respectively attached to said plugs for the power supply and the video and audio signals for enabling the operation of the transmitting apparatus by power from the video camera;
   said transmitting apparatus further comprising a frequency conversion means which converts the frequency of the video and audio signals to a predetermined transmission frequency band; and
   a transmission antenna which transmits the video and audio signals converted in said frequency conversion means.

2. A system for wireless transmission of a first television signal including a video signal and a corresponding audio signal and for selective reception of the first television signal or a second broadcast television signal for display on a television receiver, said system comprising:
   a wireless transmitting apparatus for transmitting the video signal and the corresponding audio signal of the first television signal; and
   a receiving apparatus for selectively receiving the video signal and the corresponding audio signal of the first television signal or the second broadcast television signal;
   said receiving apparatus comprising:
      a detection means having a hysteresis function which detects the presence of the video signal of the first television signal when said video signal is present for longer than a predetermined time;
      a switching means which switches and selectively automatically supplies the first television signal or the second television signal to the television receiver; and
      a control means which controls the switching means so as to supply to the television receiver the first television signal when the video signal of the first television signal is detected by the detection means.

3. A system for wireless transmission and reception of a video signal and a corresponding audio signal as set forth in claim 2, said receiving apparatus further having a frequency conversion means which converts the first television signal to a predetermined fixed frequency band and supplies the frequency-converted first television signal to the detection means.

* * * * *